US010087761B2

(12) United States Patent
Calvert et al.

(10) Patent No.: US 10,087,761 B2
(45) Date of Patent: Oct. 2, 2018

(54) DEVICES AND METHODS FOR BALANCING A HIGH-PRESSURE SPOOL OF A GAS TURBINE ENGINE

(71) Applicant: Pratt & Whitney Canada Corp., Longueuil (CA)

(72) Inventors: Bruce Alan Calvert, Burlington (CA); Richard Brian Wirth, Stoney Creek (CA); Danny Krause, Puslinch (CA)

(73) Assignee: PRATT & WHITNEY CANADA CORP., Longueil (CA)

( * ) Notice: Subject to any disclaimer, the term of this patent is extended or adjusted under 35 U.S.C. 154(b) by 1152 days.

(21) Appl. No.: 14/135,685

(22) Filed: Dec. 20, 2013

(65) Prior Publication Data

US 2015/0177091 A1    Jun. 25, 2015

(51) Int. Cl.
| | |
|---|---|
| *F01D 5/02* | (2006.01) |
| *F01D 17/02* | (2006.01) |
| *F01D 17/06* | (2006.01) |
| *G01M 15/14* | (2006.01) |

(52) U.S. Cl.
CPC ............. *F01D 5/027* (2013.01); *F01D 17/02* (2013.01); *F01D 17/06* (2013.01); *F05D 2260/15* (2013.01); *G01M 15/14* (2013.01)

(58) Field of Classification Search
CPC ......... G01M 1/16; G01M 15/14; F01D 17/02; F01D 5/027; F01D 17/06; F05D 2260/15
See application file for complete search history.

(56) References Cited

U.S. PATENT DOCUMENTS

| 4,608,650 A | * | 8/1986 | Kapadia | G01M 1/22 |
| | | | | 700/279 |
| 4,737,076 A | * | 4/1988 | Bonner | F01D 5/025 |
| | | | | 403/273 |
| 5,140,856 A | * | 8/1992 | Larsen | G01M 1/28 |
| | | | | 416/144 |
| 5,219,454 A | * | 6/1993 | Class | F16F 15/34 |
| | | | | 416/144 |
| 5,544,073 A | | 8/1996 | Piety et al. | |
| 6,082,967 A | * | 7/2000 | Loisy | F02C 3/113 |
| | | | | 415/68 |
| 6,129,768 A | * | 10/2000 | Johnson | D06F 37/225 |
| | | | | 68/23.1 |

(Continued)

FOREIGN PATENT DOCUMENTS

EP            0577159 A1    1/1994

*Primary Examiner* — Paul West
*Assistant Examiner* — Mark A Shabman
(74) *Attorney, Agent, or Firm* — Norton Rose Fulbright Canada LLP

(57) ABSTRACT

Devices and methods useful for balancing high-pressure spools of gas turbine engines are disclosed. An exemplary device may comprise: an input shaft configured to be coupled to an output of an accessory gear box driven by a high-pressure spool of a gas turbine engine; a first trigger rotatably coupled to the input shaft at a first speed ratio; and a sensor configured to detect the trigger at each revolution of the trigger. The first speed ratio may permit a rotational speed of the first trigger to be substantially the same as a rotational speed of the high-pressure spool. Upon detection of the trigger, the sensor may generate one or more signals representative of each associated revolution of the high-pressure spool of the gas turbine engine.

10 Claims, 10 Drawing Sheets

(56) References Cited

U.S. PATENT DOCUMENTS

| | | | |
|---|---|---|---|
| 6,923,058 B2* | 8/2005 | Nieman | F16F 15/20 29/901 |
| 7,400,943 B2 | 7/2008 | Vian et al. | |
| 7,640,802 B2* | 1/2010 | King | G01H 1/003 702/113 |
| 7,654,138 B2* | 2/2010 | Thelen | F01D 5/027 73/460 |
| 7,866,213 B2* | 1/2011 | Twerdochlib | G01H 1/006 702/56 |
| 8,066,486 B2* | 11/2011 | Christinsen | G01H 1/06 290/44 |
| 8,100,009 B2 | 1/2012 | Dyer | |
| 8,291,764 B2* | 10/2012 | Lenz | G01M 1/16 700/279 |
| 8,308,435 B2 | 11/2012 | Storace et al. | |
| 8,424,371 B2* | 4/2013 | Seitz | G01M 1/30 73/146 |
| 2004/0199348 A1* | 10/2004 | Hitchcock | G01M 13/028 702/92 |
| 2006/0005623 A1* | 1/2006 | Hildebrand | F16F 15/1414 73/468 |
| 2007/0006636 A1* | 1/2007 | King | G01H 1/003 73/1.84 |
| 2009/0165273 A1* | 7/2009 | Calvert | F01D 5/027 29/281.5 |
| 2011/0109305 A1 | 5/2011 | Galivel | |
| 2011/0296686 A1* | 12/2011 | Strother | F01D 5/027 29/889.2 |
| 2012/0192570 A1* | 8/2012 | McCune | F01D 25/18 60/792 |
| 2013/0000314 A1* | 1/2013 | McCaffrey | F01D 13/003 60/773 |
| 2015/0177091 A1* | 6/2015 | Calvert | F01D 17/02 73/462 |
| 2015/0226709 A1* | 8/2015 | Russhard | G01N 29/44 416/61 |

* cited by examiner

Fig_1

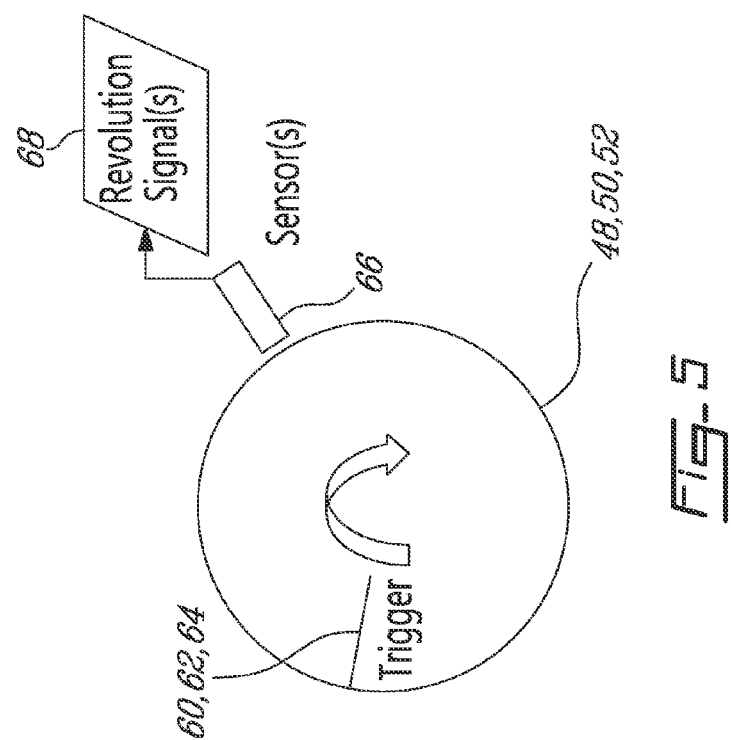
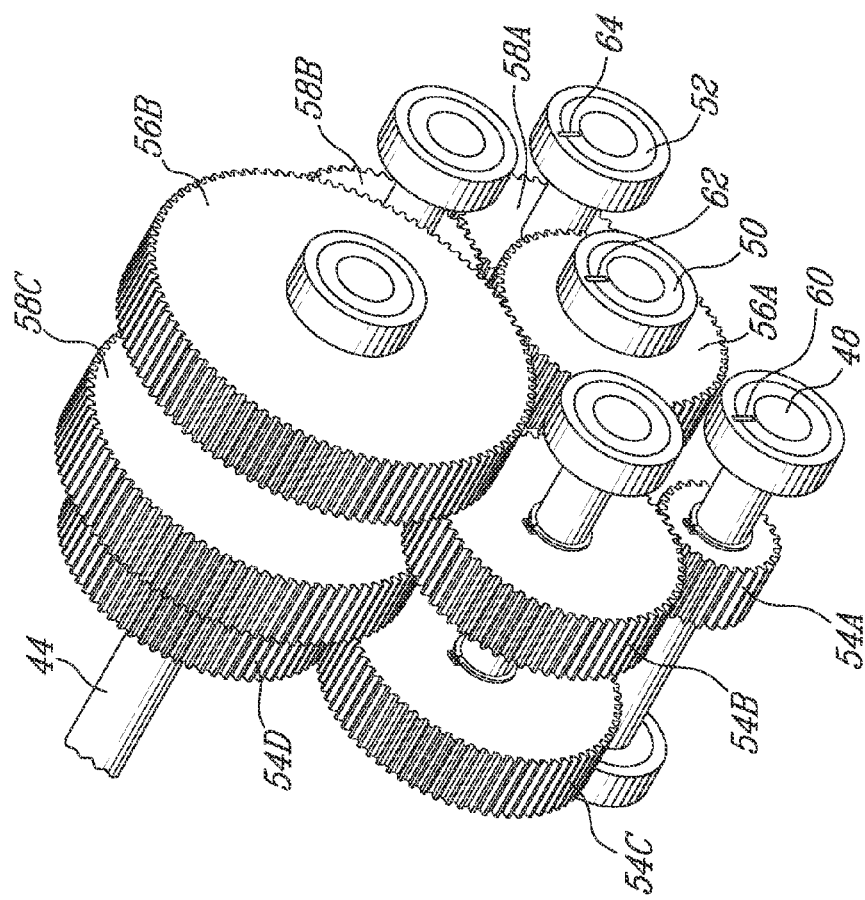
Fig-5
Fig-4

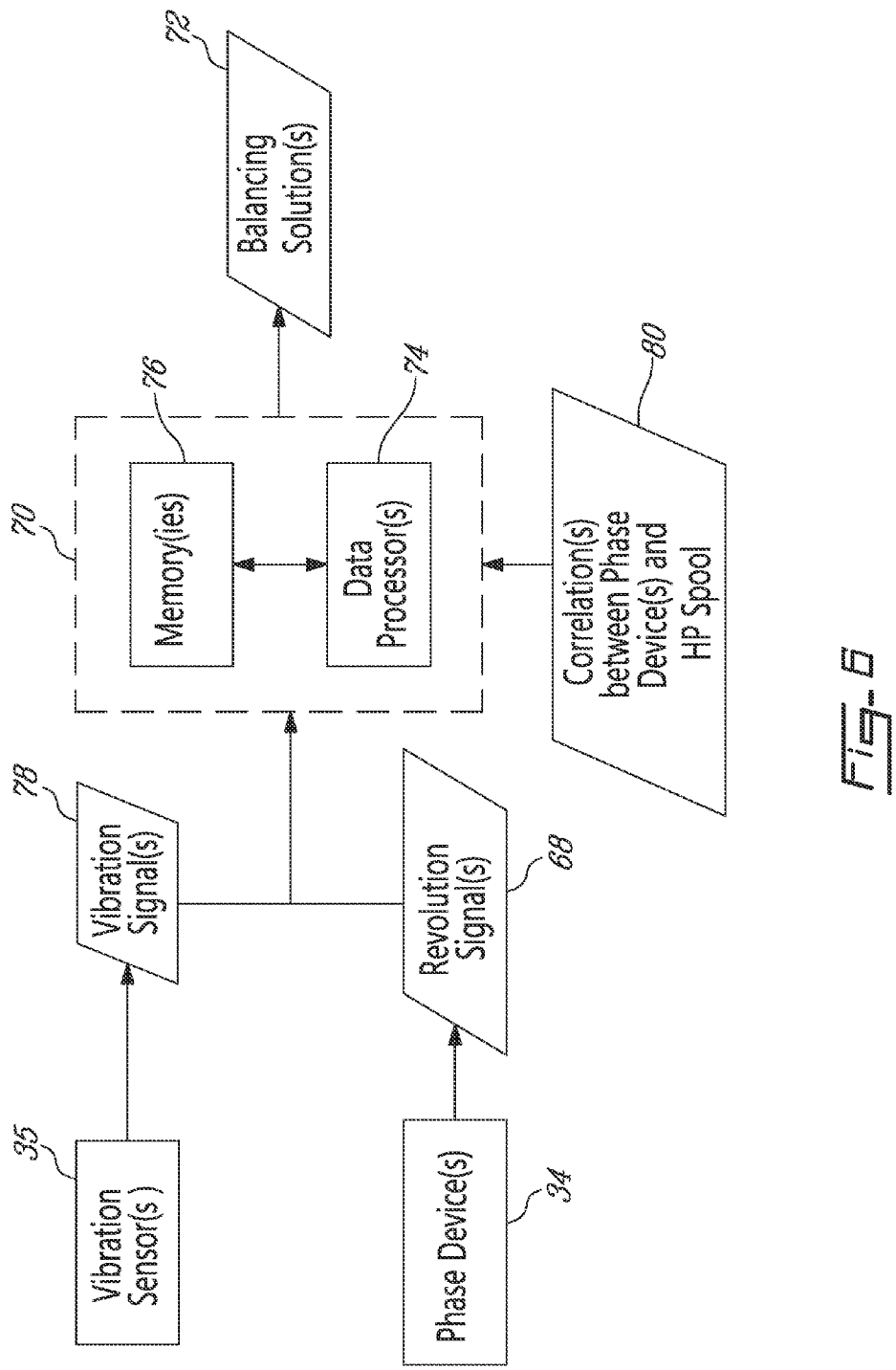

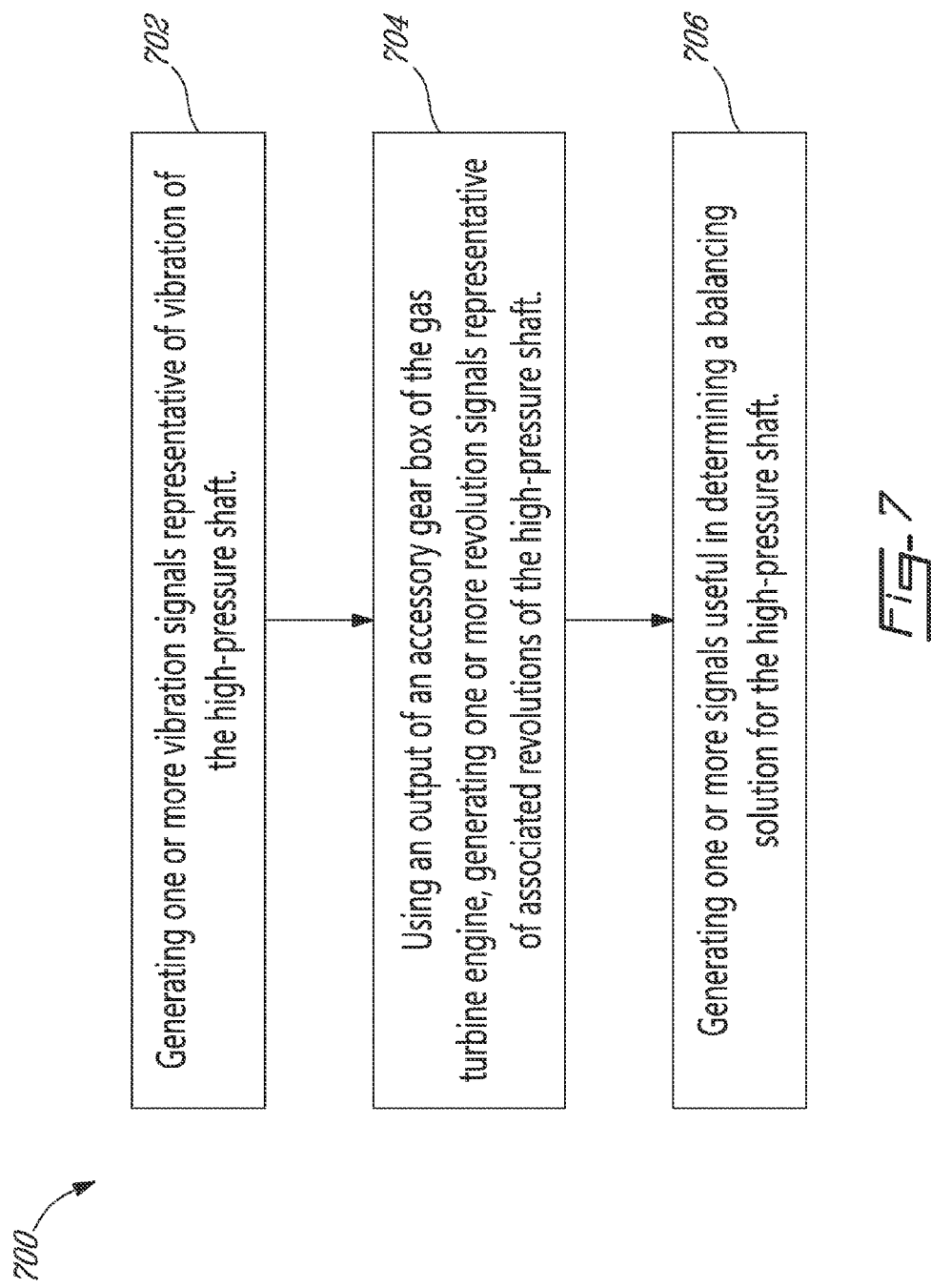

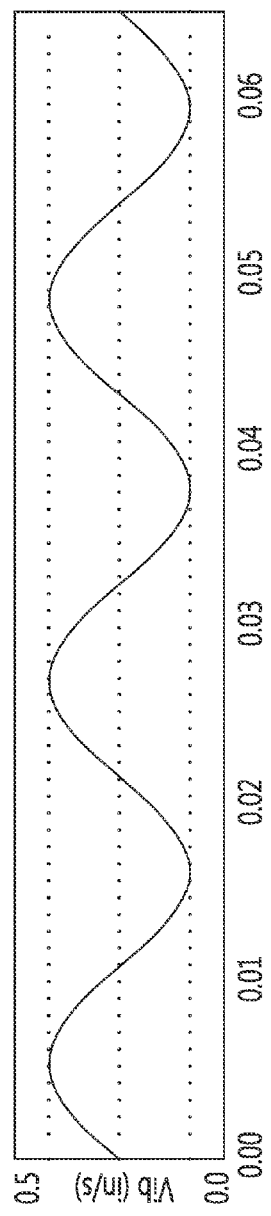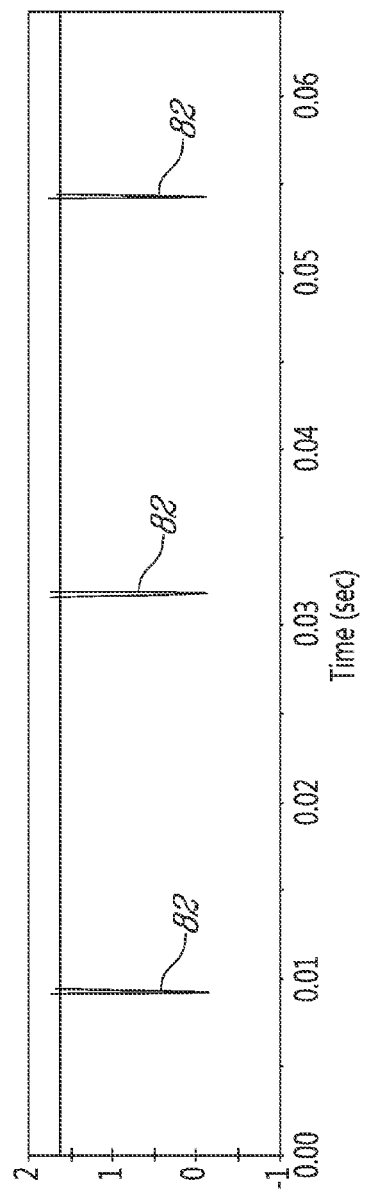
Fig-8A
Fig-8B

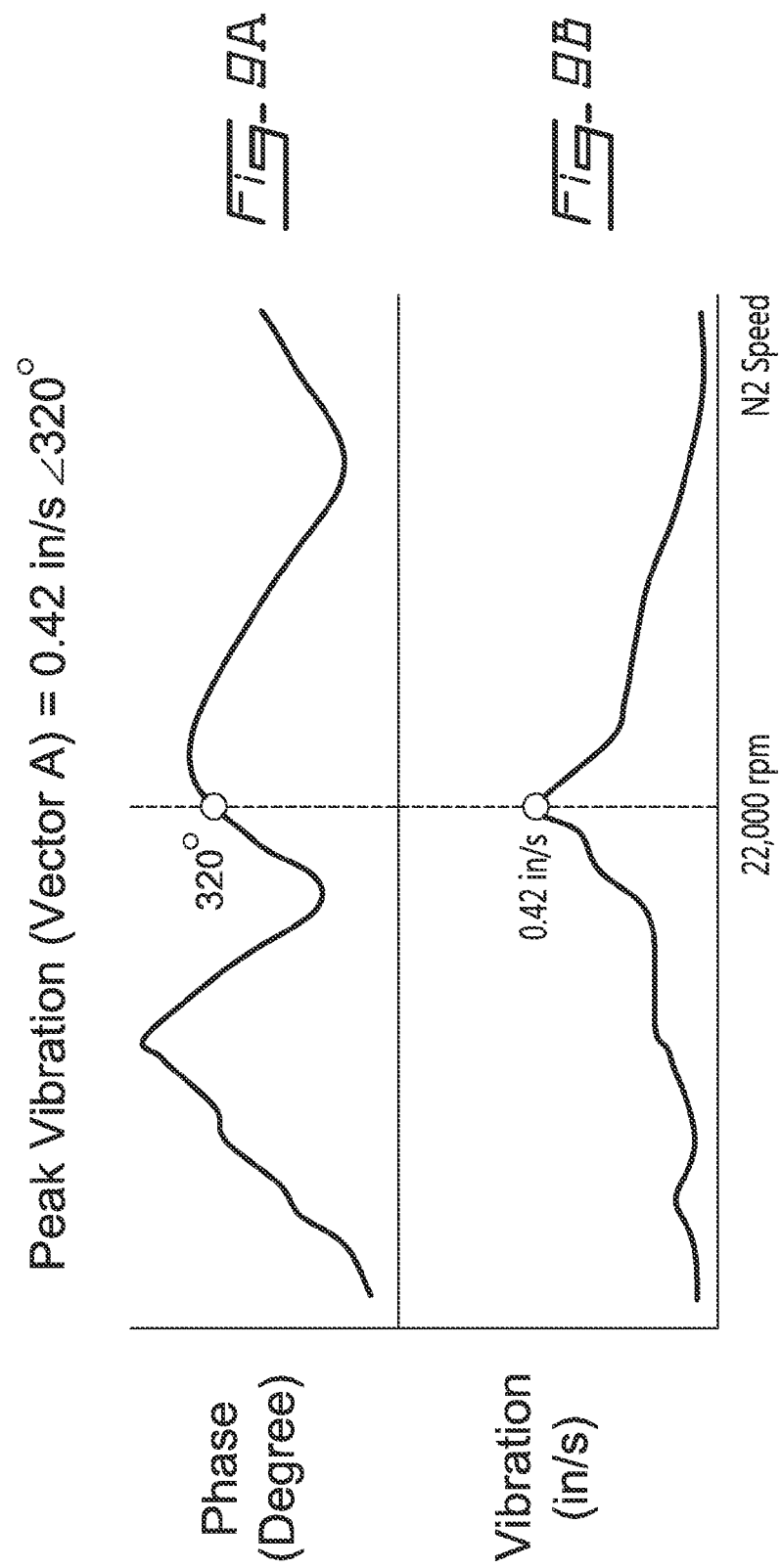

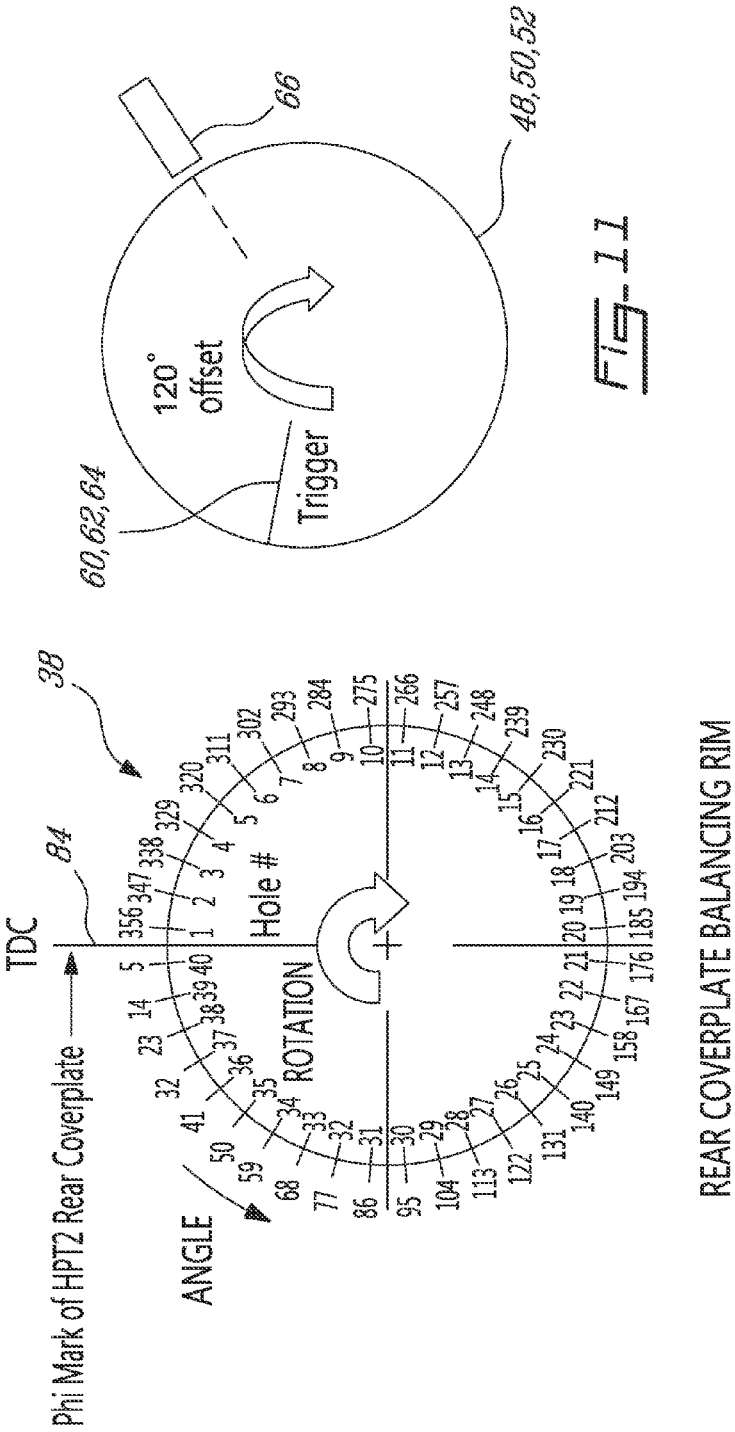

US 10,087,761 B2

DEVICES AND METHODS FOR BALANCING A HIGH-PRESSURE SPOOL OF A GAS TURBINE ENGINE

TECHNICAL FIELD

The disclosure relates generally to balancing of rotors of gas turbine engines, and more particularly to balancing of high-pressure spools of gas turbine engines.

BACKGROUND OF THE ART

When determining a balancing solution for a rotor, vibration magnitude and phase data are typically required. In most two-spool gas turbine engines, the phase data of the high-pressure spool is not available during normal operation. Accordingly, the acquisition of vibration and phase data for the balancing of the high-pressure spool is typically conducted while the high-pressure spool is rotated at sub-idle speeds and also while the engine is partially disassembled in order to visually expose a portion of the high-pressure spool during balancing. Since the dynamic characteristics of the high-pressure spool can be quite different at normal operating speeds than they are at reduced, sub-idle speeds, the balancing solution acquired under such reduced speed conditions may not necessarily be ideal for typical operating conditions of such gas turbine engines.

Improvement is therefore desirable.

SUMMARY

The disclosure describes components, devices and methods useful for balancing of high-pressure spools of gas turbine engines.

In one aspect, the disclosure describes a device useful in determining a balancing solution for a high-pressure spool of a gas turbine engine. The device may comprise:

an input shaft configured to be coupled to an output of an accessory gear box driven by the high-pressure spool of the gas turbine engine;

a first trigger rotatably coupled to the input shaft at a first speed ratio, the first speed ratio permitting a rotational speed of the first trigger to be substantially the same as a rotational speed of the high-pressure spool; and a sensor configured to detect the trigger at each revolution of the trigger and, upon detection of the trigger, generate one or more signals representative of each associated revolution of the high-pressure spool of the gas turbine engine.

In another aspect, the disclosure describes a device useful in determining a balancing solution for a high-pressure spool of a gas turbine engine. The device may comprise:

an interface configured to receive rotary input from an accessory gear box driven by the high-pressure spool of the gas turbine engine; and an output configured to generate one or more signals representative of each revolution of the high-pressure spool of the gas turbine engine associated with the rotary input.

In a further aspect, the disclosure describes a method useful in determining a balancing solution for a high-pressure spool of a gas turbine engine. The method may comprise:

generating one or more vibration signals representative of vibration of the high-pressure spool during operation of the gas turbine engine;

using an output of an accessory gear box of the gas turbine engine during operation of the gas turbine engine, generating one or more revolution signals representative of revolutions of the high-pressure spool associated with the output of the accessory gear box; and using the one or more vibration signals and the one or more revolution signals, generating one or more signals useful in determining a balancing solution for the high-pressure spool.

Further details of these and other aspects of the subject matter of this application will be apparent from the detailed description and drawings included below.

DESCRIPTION OF THE DRAWINGS

Reference is now made to the accompanying drawings, in which:

FIG. 4 is an axonometric view of exemplary gear trains of the phase device of FIG. 3;

FIG. 5 is a schematic representation of an exemplary sensor configured to detect a rotatable trigger of the phase device of FIG. 3;

FIG. 6 is a schematic representation of an exemplary computing device configured to generate signals useful in determining a balancing solution for the high-pressure spool of FIG. 2;

FIG. 7 is a flowchart illustrating an exemplary method useful in balancing the high-pressure spool of FIG. 2;

FIGS. 8A and 8B respectively show exemplary vibration data and revolution data plotted against a common time scale;

FIGS. 9A and 9B respectively show exemplary vibration data and phase data plotted against the rotational speed of the high-pressure spool of FIG. 2;

FIG. 10 is a schematic representation of an exemplary balancing rim of the high-pressure spool of FIG. 2 viewed along an axis of rotation of the high-pressure spool;

FIG. 11 is a schematic representation of the exemplary sensor and trigger of FIG. 5 showing an angular offset between an angular position of the trigger of the phase device and an angular position of a reference point on the high-pressure spool of FIG. 2.

DETAILED DESCRIPTION

Aspects of various embodiments are described through reference to the drawings.

Figure 1:
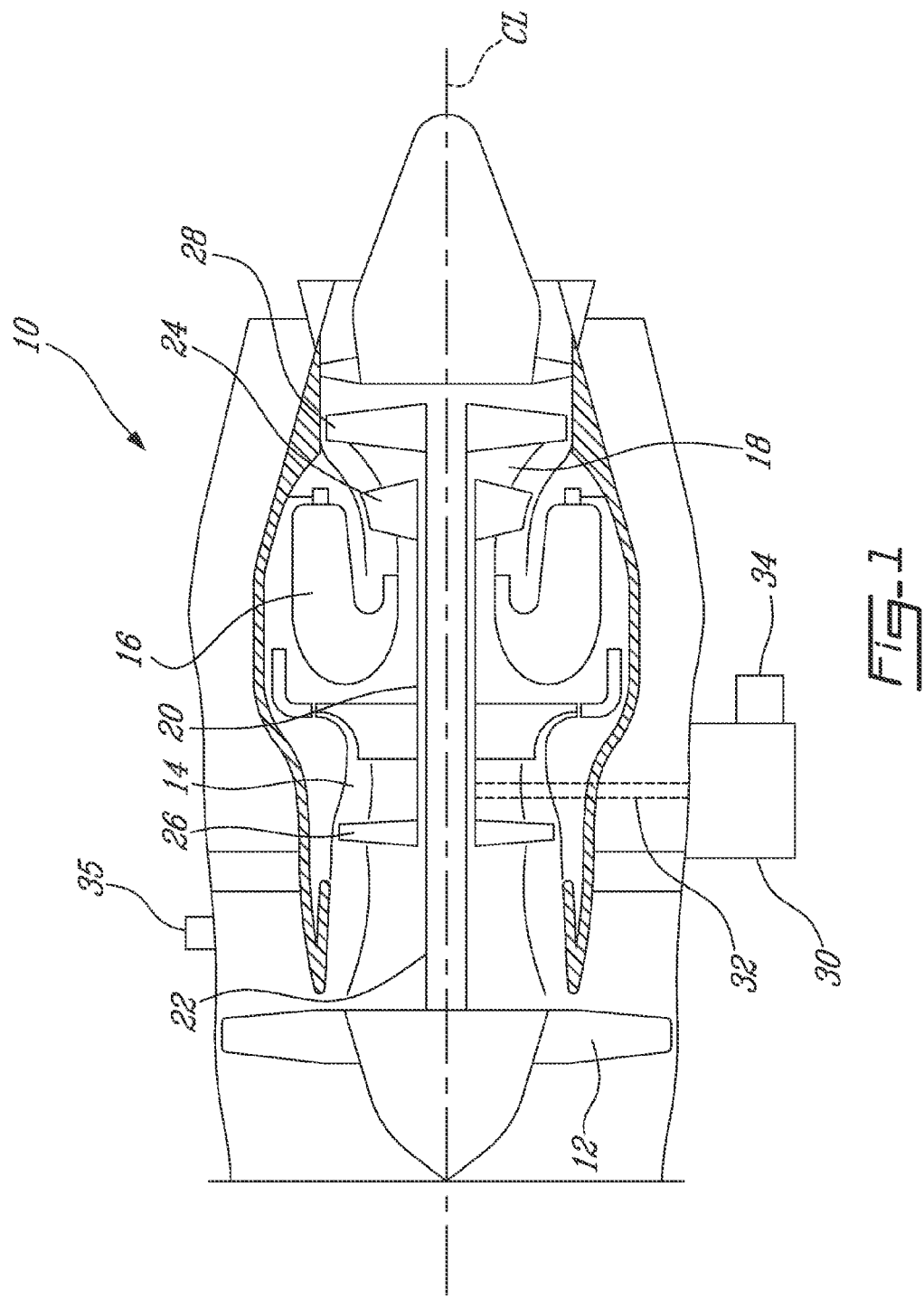
FIG. 1 is a schematic, axial cross-section view of an exemplary turbo-fan gas turbine engine.

FIG. 1 illustrates a gas turbine engine 10 of a type preferably provided for use in subsonic flight, generally comprising in serial flow communication, fan 12 through which ambient air is propelled, multistage compressor 14 for pressurizing the air, combustor 16 in which the compressed air is mixed with fuel and ignited for generating an annular stream of hot combustion gases, and turbine section 18 for extracting energy from the combustion gases.

Engine 10 may comprise a conventional or other type of gas turbine engine suitable for use in aircraft applications. For example, engine 10 may comprise a turbofan or a turboprop type of engine. In various embodiments, engine 10 may comprise a two-spool turbofan engine. For example, engine 10 may comprise high-pressure spool 20 and low-pressure spool 22. High-pressure spool 20 and low-pressure spool 22 may be mounted for rotation about axis CL of engine 10. High-pressure spool 20 and low-pressure spool 22 may be mounted coaxially and rotate in opposite directions during use. High-pressure spool 20 may comprise one or more high-pressure turbine stages 24 and one or more high-pressure compressor stages 26. Low-pressure spool 22 may comprise one or more low-pressure turbine stages 28 and fan 12.

Engine 10 may also comprise one or more accessory gear boxes 30 (referred hereinafter as "AGB 30") that may be used to drive one or more accessories (e.g., electrical generator, fuel pump, etc.) associated with the operation of engine 10 or with the operation of an aircraft (not shown) to which engine 10 may be mounted. AGB 30 may be driven by high-pressure spool 20 via tower shaft 32. FIG. 1 also shows phase device 34, which is described in detail below, and which may be coupled to and driven via AGB 30 during acquisition of data useful in determining one or more balancing solutions for high-pressure spool 20 while high-pressure spool 20 may be operated at typical operating speeds. Engine 10 may also comprise one or more vibration sensors 35. Vibration sensor(s) 35 may be disposed in different locations of engine 10 to detect vibrations in different portions of engine 10. In various embodiments, vibration sensor(s) 35 may be secured to one or more casings of engine 10. For example, a plurality of vibration sensors 35 may be disposed at spaced-apart locations along an axial direction of engine 10. Vibration sensor(s) 35 may, for example, comprise any suitable known or other type of transducer configured to generate one or more signals representative of displacement, velocity and/or acceleration. In various embodiments, vibration sensor(s) 35 may be used to obtain one or more velocity measurements as a function of time.

Figure 2:
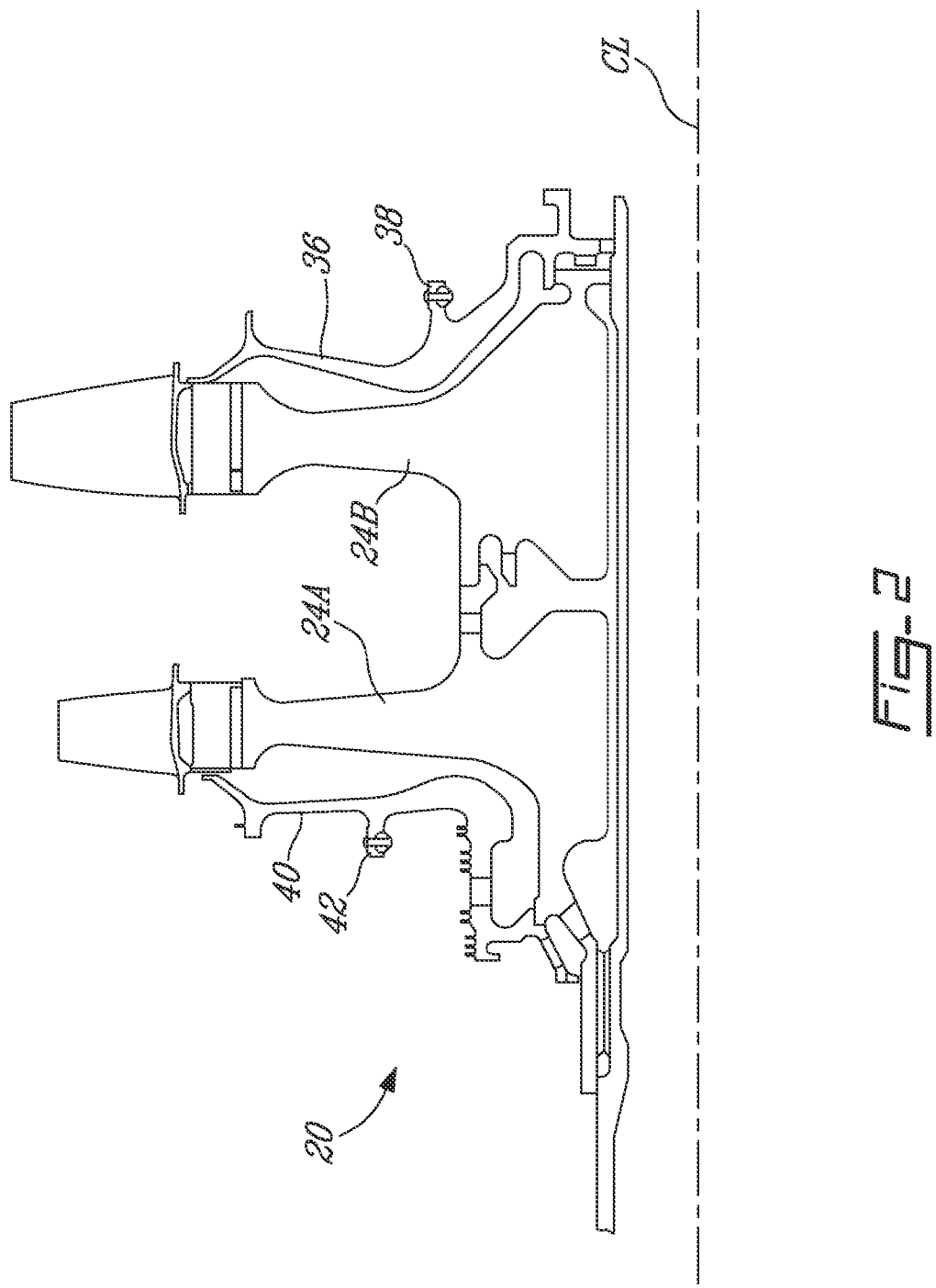
FIG. 2 is a partial axial cross-section view of an exemplary high-pressure spool of the gas turbine engine of FIG. 1.

FIG. 2 is a partial axial cross-section view of high-pressure spool 20. In particular, FIG. 2 shows a portion of high-pressure spool 20 associated with high-pressure turbine stages 24. As mentioned above, high-pressure turbine stages 24 may comprise first stage 24A and second stage 24B. High-pressure spool 20 may comprise first (i.e., rear) cover plate 36 disposed on a downstream side of high-pressure turbine stage(s) 24 and may include first balancing rim 38. High-pressure spool 20 may also comprise second cover plate 40 disposed on an upstream side of high-pressure turbine stage(s) 24 and may include second balancing rim 42. As explained further below, balancing rims 38 and 42 may be configured to permit the attachment of correction weights thereon to counteract unbalances detected in high-pressure spool 20. High-pressure spool 20 may comprise one or more balancing rims or other balancing features not shown in FIG. 2. For example, high-pressure spool 20 may, in some embodiments, comprise one or more additional balancing rims spaced along an axial direction of high-pressure spool 20 in order to permit balancing of different axial portions of high-pressure spool 20, if necessary.

Figure 3:
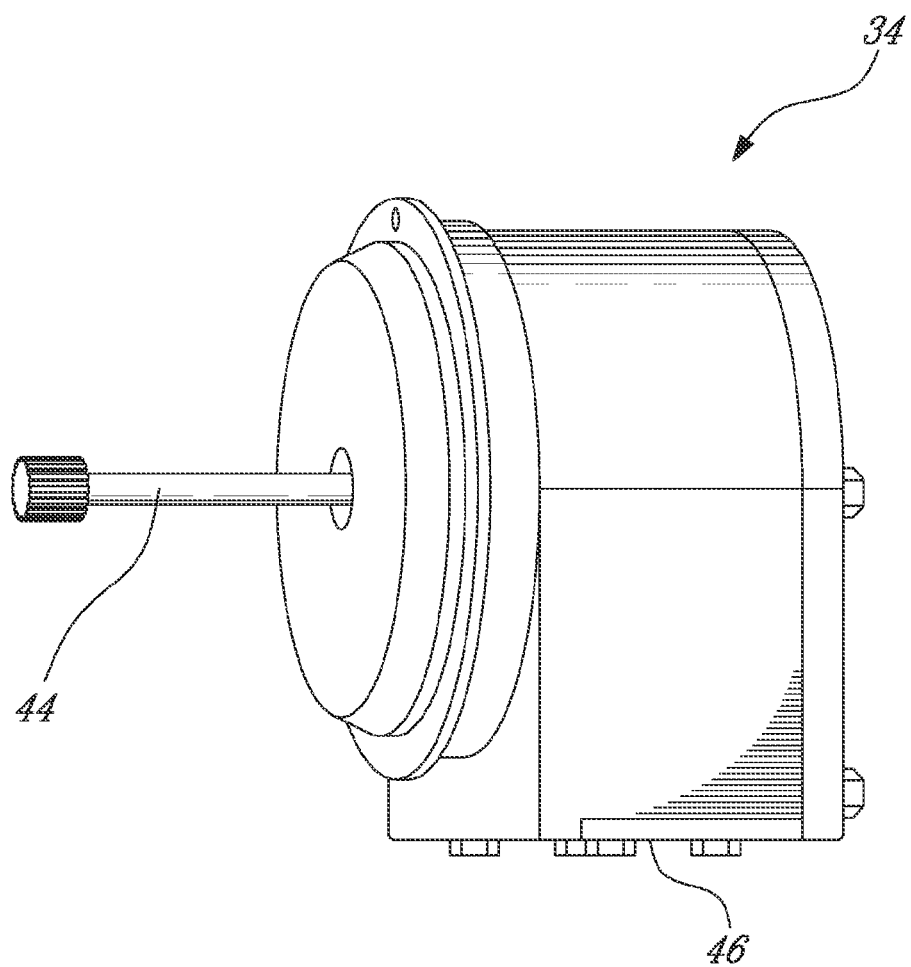
FIG. 3 is an axonometric view of an exemplary phase device useful for balancing the high-pressure spool of FIG. 2.

FIG. 3 is an axonometric view of an exemplary phase device 34 that may be used during the acquisition of vibration data associated with high-pressure spool 20 under typical operating conditions of engine 10. Phase device 34 may comprise an interface for coupling to AGB 30. For example, such interface may comprise one or more input shafts 44 (referred hereinafter as "input shaft 44") and one or more mounting surfaces 46 (referred hereinafter as "mounting surface 46") for interfacing with a mounting pad (not shown) of AGB 30. Accordingly, input shaft 44 may be configured to receive rotary input from an output of AGB 30 driven by high-pressure spool 20 of engine 10. As explained below, phase device 34 may be configured to generate one or more signals representative of each revolution of high-pressure spool 20 during the acquisition of vibration data based on the rotary input received from AGB 30 via input shaft 44.

FIG. 4 is an axonometric view of exemplary gear trains 54, 56, 58 that may be part of phase device 34. Phase device 34 may be configured to be used on different types or families of engines 10. Accordingly, phase device 34 may comprise a plurality of outputs coupled to input shaft 44 via different combinations of gears. For example, phase device 34 may comprise a plurality of output shafts 48, 50 and 52 rotatably coupled to input shaft 44. First output shaft 48 may be rotatably coupled to input shaft 44 at a first speed (e.g., gear) ratio via first gear train 54 comprising gears 54A, 54B, 54C and 54D. Second output shaft 50 may be rotatably coupled to input shaft 44 at a second speed (e.g., gear) ratio via second gear train 56 comprising gears 56A and 56B. Third output shaft 52 may be rotatably coupled to input shaft 44 at a third speed (e.g., gear) ratio via third gear train 58 comprising gears 58A, 58B and 58C. The presence of multiple output shafts 48, 50, 52 and associated respective gear trains 54, 56, 58 may permit phase device 34 to be used on different types or families of gas turbine engines.

The first speed ratio obtained via gear train 54 between first output shaft 48 and input shaft 44 may be configured to permit a rotational speed of first output shaft 48 to be substantially identical to a rotational speed of high-pressure spool 20. In other words, gear train 54 may be configured to, based on the rotational speed of input shaft 44, reproduce the rotational speed of high-pressure spool 20 at output shaft 48. Accordingly, gear train 54 may be configured for a specific configuration or type of AGB 30 and tower shaft 32. Second gear train 56 and third gear train 58 may be configured for use in conjunction with other configurations or types of AGBs or tower shafts so that the rotational speeds of high-pressure spools on other types or families of engines may be reproduced via second output shaft 56 and third output shaft 58. Accordingly, the presence of multiple output shafts 48, 50, 52 may permit phase device 34 to be used in conjunctions with different engines where the appropriate output shaft 48, 50, 52 would be used for the specific engine with which phase device 34 may be used. Each output shaft 48, 50, 52 may comprise a respective trigger 60, 62, 64. Triggers 60, 62, 64 may be rotatable and detectable by one or more respective sensors 66 (see FIG. 5). It should be understood that additional or fewer output shafts and associated gear trains may be provided in phase device 34 depending on the number or types or families of engines with which phase device 34 is to be used. For example, in some embodiments, phase device 34 may comprise a single output shaft 48 and associated gear train 54.

FIG. 5 is a schematic representation of an exemplary sensor 66 configured to detect one or more of triggers 60, 62, 64 on respective output shafts 48, 50, 52. An end view of an exemplary output shaft 48, 50, 52 is shown in FIG. 5. In various embodiments, phase device 34 may comprise a respective sensor 66 associated with each output shaft 48, 50, 52 for detecting respective triggers 60, 62, 64. The types of triggers 60, 62 and 64 and sensors 66 may be selected to cooperate together in generating one or more signals 68 when one of triggers 60, 62 and 64 is detected by an associated sensor 66. Triggers 60, 62 and 64 may comprise one or more markings, mechanical and/or magnetic features and/or other suitable type of feature(s) detectable by an associated sensor 66. Similarly, sensor 66 may comprise one or more proximity, mechanical, optical and/or magnetic detectors and/or other suitable type of sensor for detecting one or more of triggers 60, 62, 64.

In various embodiments, each output shaft 48, 50, 52 may comprise a single respective trigger 60, 62, 64 that may be detectable by a respective sensor 66. For the purpose of the following description, output shaft 48 and trigger 60 will be referenced in conjunction with sensor 66 but it should be understood that, in some embodiments, the structure and functions of output shafts 50, 52 and triggers 62, 64 with other respective sensors 66 may be substantially identical or functionally equivalent. Trigger 60 may be secured to, integral with or otherwise associated with output shaft 48 so that trigger 60 may rotate together and at the same rotational speed as output shaft 48. Accordingly, trigger 60 may pass and be detected by sensor 66 once for every complete revolution of output shaft 48. Upon detection of the passing of rotating trigger 60, sensor 66 may output one or more revolution signals 68. Since the rotational speed of output shaft 48 may be substantially identical to the rotational speed of high-pressure spool 20 (i.e., sometimes referred as "N2"), each complete revolution of trigger 60 may correspond to an associated complete revolution of high-pressure spool 20. Accordingly, revolution signal(s) 68 generated by sensor 66 upon detection of trigger 60 may consequently be representative of an associated revolution of high-pressure spool 20. In various embodiments, revolution signal(s) 68 may comprise one or more once-per-revolution signals where consecutive once-per-revolution signals may indicate the completion of consecutive revolutions of high-pressure spool 20.

FIG. 6 is a schematic representation of an exemplary computing device 70 configured to generate one or more signals 72 representative of at least part of a balancing solution for high-pressure spool 20. In various embodiments, computing device 70 may comprise one or more data processors 74 (referred hereinafter as "processor 74") and one or more memories 76 (referred hereinafter as "memory 76"). For example, computing device 70 may comprise one or more digital computer(s) or other data processors and related accessories. Data processor 74 may include one or more microcontrollers, microprocessors or other suitably programmed or programmable logic circuits. Memory 76 may comprise any storage means (e.g. devices) suitable for retrievably storing machine-readable instructions executable by processor 74. Memory 76 may comprise, for example, but is not limited to, an electronic, magnetic, optical, electromagnetic, infrared, or semiconductor system, apparatus or device. More specific examples, but nonetheless a non-exhaustive list, of memory 76 would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical).

Memory 76 may contain machine-readable instructions for execution by processor 74. Such machine-readable instructions may cause processor 74 to carry out various methods or portion of methods disclosed herein. In various embodiments, signals 78 representative of vibration of high-pressure spool 20 may be generated by one or more vibration sensors 35 (referred hereinafter as "vibration sensor 35") and provided directly or indirectly to computing device 70. Similarly, revolution signal(s) 68 may be generated by sensor 66 and provided directly or indirectly to computing device 70. It should be understood that, in some embodiments, suitable conditioning of signals 78, 68 may be required prior to processing by processor 74. Using vibration signals 78 and revolution signals 68, data processor 74 may, in accordance with computer-readable instructions stored in memory 76, generate one or more signals 72 representative of at least part of the balancing solution. For example, signals 72 may be representative of: vibration data including one or more vibration peaks. Such vibration data may include time values associated with discrete vibration measurements (i.e., magnitudes) and the time values may be associated with a common time scale as time values associated with revolution signals 68. Accordingly, such vibration data may be correlated to revolution signals 68 via a common time scale. In various embodiments, signals 72 may be useful in determining one or more correction weights and one or more corresponding times to or from once-per-revolution signal(s) from revolution signals 68. Alternatively or in addition, signals 72 may be representative of one or more correction weights and one or more corresponding angular positions of trigger 60 relative to sensor 66 and/or one or more corresponding angular positions on a balancing rim 38, 42 of high-pressure spool 20. For example, computing device 70 may, in accordance with computer-readable instructions provided in memory 76, consider one or more correlations 80 between the angular position of trigger 60 and the angular position of high-pressure spool 20 so that signal(s) 72 may be indicative of one or more correction weights suitable to remedy one or more unbalance conditions of high-pressure spool 20 together with one or more angular positions on balancing rim 38, 42 of high-pressure spool 20. In various embodiments, such signal(s) 72 may provide some indication useful for the installation of one or more correction weights on high-pressure spool 20.

In order to determine a balancing solution for a rotor, vibration magnitude and phase data are typically required. In most two-spool gas turbine engines, the phase data of the high-pressure spool is not available during normal operation. Accordingly, the acquisition of vibration and phase data for the balancing of the high-pressure spool is typically conducted while the high-pressure spool is rotated at sub-idle speeds and also while the engine is partially disassembled in order to expose a portion of the high-pressure spool. Since the dynamic characteristics of the high-pressure spool can be quite different at full operating speeds than they are at reduced, sub-idle speeds, the balancing solution acquired under such reduced speed conditions may not necessarily be ideal for typical operating conditions of such gas turbine engines.

During operation, phase device 34 and, optionally, computing device 70 may be used in the determination of a balancing solution for high-pressure spool 20. In various embodiments, the acquisition of vibration signal(s) 78 may be conducted using vibration sensor 35 under typical operating conditions of engine 10 and at typical operating rotational speeds of high-pressure spool 20 while phase device 34 is coupled to AGB 30. Phase device 34 may be installed to an accessory pad of AGB 30 via mounting surface 46 and input shaft 44 may be coupled to an output of AGB 30. Phase device 34 may be mounted to a free accessory pad of AGB 30 or an existing accessory may be removed so that phase device 34 may be installed in its place. For example, the acquisition of vibration signal(s) 78 may be conducted at typical operating rotational speeds of high-pressure spool 20 so that the balancing solution(s)

determined may take into account the dynamic characteristics of high-pressure spool 20 at typical operating speeds. Similarly, the acquisition of vibration signal(s) 78 may be conducted over a range of rotational speeds of high-pressure spool 20 so that the balancing solution(s) determined may take into account the dynamic characteristics of high-pressure spool 20 in different operating regimes. In various embodiments, the acquisition of vibration signal(s) 78 may, for example, be conducted while engine 10 is in a test cell or when engine 10 is on-wing (e.g., in the field). For example, the acquisition of vibration signal(s) 78 and or revolution signal(s) 68 may be acquired during operation of engine 10 and the balancing solution(s) may be determined subsequently.

In various embodiments, vibration signal(s) 78 acquired via vibration sensor 35 may comprise components that represent vibrations from sources other than high-pressure spool 20. For example, vibration signal(s) 78 may represent substantially all of the vibrations that may be sensed by vibration sensor 35 whether or not they originate from high-pressure spool 20. Accordingly, some filtering or other processing of vibration signal(s) 78 may be required to isolate the component(s) that is/are representative of vibrations associated with high-pressure spool 20. Filtering or other processing of vibration signal(s) 78 may be conducted according to known or other methods. For example, vibration signal(s) 78 may be filtered through the use of engine order analysis of the specific speed(s) of interest (e.g., the rotational speed N2 of high-pressure spool 20). Accordingly, the frequency and phase information of vibrations stemming from other sources may be filtered out from vibration signal(s) 78 or otherwise ignored in the determination of a balancing solution for high-pressure spool 20.

FIG. 7 is a flowchart illustrating an exemplary method 700 which may be useful determining one or more balancing solutions for high-pressure spool 20. In various embodiments, method 700 may comprise: generating one or more vibration signals 78 representative of vibration of high-pressure spool 20 during operation of gas turbine engine 10 (see block 702); using an output of AGB 30 of gas turbine engine 10 during operation of gas turbine engine 10, generating one or more revolution signals 68 representative of revolutions of high-pressure spool 20 associated with the output of AGB 30 (see block 704); and using the one or more vibration signals 78 and the one or more revolution signals 68, generating one or more signals 72 useful in determining a balancing solution for high-pressure spool 72. In various embodiments, method 700 or portions thereof may be performed using phase device 34, vibration sensor(s) 35 and/or computing device(s) 70. It should be understood that method 700 may comprise additional or fewer steps or blocks than those shown in FIG. 7. There may be many variations to these blocks and/or operations without departing from the teachings of the present disclosure. For instance, the blocks may be performed in a differing order, or blocks may be added, deleted, or modified. As explained above signal(s) 72 may useful in determining one or more balancing solutions for high-pressure spool 20 and may be representative of a partial balancing solution helpful in selecting one or more correction weights and its/their associated position(s) on the high-pressure spool 20.

In various embodiments, the generating of revolution signal(s) 68 may comprise converting a rotational speed of the output of AGB 30 to a rotational speed substantially identical to the rotational speed of high-pressure spool 20. As explained above, this may be conducted via output shaft 48 and associated gear train 54 of phase device 34. The generating of revolution signal(s) 68 may comprise detecting trigger 60 associated with output shaft 48 and having substantially the same rotational speed as that of high-pressure spool 20. Revolution signal(s) 68 may be based on the detection of a single trigger 60 having substantially the same rotational speed as that of high-pressure spool 20. Accordingly, revolution signal(s) 68 may comprise one or more once-per-revolution signals where two consecutive once-per-revolution signals may indicate a complete revolution of high-pressure spool 20.

As explained above, phase device 34 may comprise a plurality of rotatable triggers 60, 62, 64 so that phase device 34 may be used in conjunction with other types or families of engines. Accordingly, method 700 may further comprise: driving first rotatable trigger 60 using the output of AGB 30 at a first speed ratio with the output of AGB 30; driving second rotatable trigger 62 using the output of AGB 30 at a second speed ratio with the output of AGB 30; and generating revolution signal(s) 68 based on the detection (e.g., via sensor(s) 66) of one of first rotatable trigger 60 and second rotatable trigger 62. In some embodiments, the first speed ratio may be configured to permit a rotational speed of first trigger 60 to be substantially identical as a rotational speed of high-pressure spool 20 and the second speed ratio may be configured to permit a rotational speed of second trigger 62 to be substantially the same as a rotational speed of a high-pressure spool of another gas turbine engine when phase device 34 is used with the other gas turbine engine.

FIGS. 8A and 8B respectively show exemplary plots of vibration signal(s) 78 and revolution signal(s) 68 plotted against a common time scale. Vibration signal(s) 78 may comprise one or more vibration magnitudes sensed using vibration sensor(s) 35. Some or all of the vibration magnitudes may be associated with corresponding time values substantially representing the time at which individual vibration magnitudes were sensed. In various embodiments, vibration signal(s) 78 may be representative of velocities (e.g., in/sec, m/s) plotted against time. Vibration signal(s) 78 may stem from one vibration sensor 35 or may comprise a combination or aggregation of vibration signals obtained from different vibration sensors 35. Revolution signal(s) 68 may comprise one or more pulses 82 indicating the detection of trigger 60 by sensor 66. Revolution signal(s) 68 may be generated simultaneously with the generation of vibration signal(s) 78. Consecutive pulses 82 in revolution signal(s) 68 as shown in FIG. 8B may be indicative of complete revolutions of trigger 60 and consequently be indicative of complete revolutions of high-pressure spool 20. Accordingly, pulses 82 may be once-per-revolution signals. Pulses 82 may each be associated with a time value substantially representing the time at which trigger 60 was sensed by sensor 66. Accordingly, vibration signal(s) 78 may be correlated with revolution signal(s) 68 based on the common time scale (i.e., abscissa in FIGS. 8A and 8B). Also since the time duration between two consecutive pulses 82 may represent a complete revolution (i.e., 360 degrees) of trigger 60, vibration magnitudes of signal(s) 78 may be correlated (e.g., synchronized) to angular position(s) of trigger 60 relative to the position of sensor 66.

FIGS. 9A and 9B respectively show exemplary vibration data and phase data plotted against the rotational speed of high-pressure spool 20. As explained above, the acquisition of vibration signal(s) 78 may be conducted at different rotational speeds of high-pressure spool 20 in order to take into account the dynamic properties of high-pressure spool 20 at different rotational speeds. Accordingly, a vibration sweep may be conducted to acquire vibration signal(s) 78 over a range of rotational speeds of high-pressure spool 20. FIG. 9A shows a plot of the phase of trigger 60 (in degrees), at which peak vibration magnitudes (obtained from vibration signal(s) 78) occur over a range of rotational speeds (i.e., N2) of high-pressure spool 20. FIG. 9B shows a plot of associated peak vibration magnitudes (in in/sec) plotted against the same range of rotational speeds (i.e., N2) of high-pressure spool 20. FIG. 9B indicates that, for this particular example, the largest vibration magnitude over the particular range of rotational speeds is 0.42 in/sec and occurs at about 22,000 rpm. FIG. 9A indicates that the corresponding phase of trigger 60 at which the largest vibration magnitude occurs is about 320°. This information may be used as a basis for determining a suitable correction weight to be installed on high-pressure spool 20.

During installation of phase device 34 to AGB 30, it may not be necessary to establish the angular relationship between the output of AGB 30 and high-pressure spool 20 at least initially. This relative angular position may be assessed, following all data collection and after some disassembly of engine 10 (e.g., via the first cover plate 36 of high-pressure shaft 20). Once phase device 34 has been synchronized to high-pressure spool 20, the vibration data (i.e. magnitude and phase) from actual operating speeds can be used to balance high-pressure spool 20. Accordingly, phase device 34 may be used when acquiring vibration data when engine 10 is in a test cell, during an engine overhaul and/or in the field with engine 10 mounted on-wing.

FIG. 10 is a schematic view of first balancing rim 38 of first cover plate 36 viewed along axis CL of FIG. 2. First balancing rim 38 may comprise a plurality of holes (e.g., numbered as numbers 1-40 in FIG. 10) which may be used to secure one or more correction weights to first balancing rim 38. The holes may be spaced about the circumference of first balancing rim 38. The angular position of each hole is also indicated in degrees in FIG. 10. First cover plate 36 may also comprise one or more reference markers sometimes called Phi marks (referred hereinafter as "Phi mark 84"). Phi mark 84 may be used to angularly align high-pressure spool 20 to a reference position (e.g., another reference mark). In various embodiments, the reference angular position of high-pressure spool 20 in engine 10 may be a location where Phi mark 84 is substantially aligned with a top dead center (TDC) of engine 10. The angular positions of holes in FIG. 10 may be measured from Phi mark 84.

In order to correlate the phase data (shown in FIG. 9A and based on angular position of trigger 60) to one or more corresponding holes in first balancing rim 38, an angular offset between trigger 60 and first balancing rim 38 may be determined. Vibration signal(s) 78 may be acquired relative to trigger 60 and subsequently correlated to high-pressure spool 20 after the acquisition of vibration signal(s) 78 has been completed. Accordingly, the determination of one or more balancing solutions may also be carried out subsequently. In various embodiments, the determination of the offset between trigger 60 of phase device 34 and first balancing rim 38 may be performed by maintenance personnel when engine 10 is not operating. Some disassembly of engine 10 may be required in order to at least partially expose first balancing rim 38 to maintenance personnel.

FIG. 11 is a schematic representation of sensor 66 and trigger 60 showing an exemplary angular offset of 120° between an angular position of trigger 60 of phase device 34 relative to sensor 66 and TDC of high-pressure spool 20. For example, high-pressure shaft 20 may be (e.g., manually) rotated until Phi mark 84 is substantially aligned with TDC. While, high-pressure spool 20 is at this position, the angular offset between trigger 60 and sensor 66 may be determined. The angular offset may be determined by slowly rotating (e.g., clockwise) first balancing rim 38 from TDC until trigger 60 of phase device 34 is sensed by sensor 66. When sensor 66 detects trigger 60, an audio and/or visual indication or alert may provide a signal to maintenance personnel indicating the position at which to determine the offset. Once trigger 60 is sensed by sensor 66, the corresponding angular position of balancing rim 38 relative to TDC may be determined via markings and/or holes provided on first cover plate 36 or via other suitable means. The angular offset may then be used to transfer the phase data of trigger 60 to high-pressure spool 20 in order to determine the angular position(s) on first balancing rim 38 at which one or more correction weights may be installed. In other words, the determination of the balancing solution for high-pressure spool 20 may be based on a first correlation between vibration signal(s) 78 and revolution signal(s) 68 and on a second correlation between revolution signal(s) 68 and angular positioning on high-pressure spool 20.

Once the angular/phase offset between phase device 34 and high-pressure spool 20 has been determined, one or more suitable balancing solutions may be determined based on vibration signal(s) 68. Suitable balancing solutions may be determined using known or other methods. In various embodiments, a balancing solution (e.g., correction weight and associated angular position) may be determined according to the relationship shown below. An numerical example is also provided below using the exemplary numerical values disclosed herein.

$$\text{Correction Weight} = \frac{-\text{Baseline Vibration Vector}}{\text{Balancing Influence Coefficient}}$$

$$= \frac{0.42 \text{ in/s} \angle (320 - 180 + \overset{\text{Phase box offset}}{\underset{\downarrow}{120°}})}{0.14 \text{ in/s/gram} \angle 270°}$$

$$= 3.0 \text{ grams} \angle 110°$$

Figure 12:
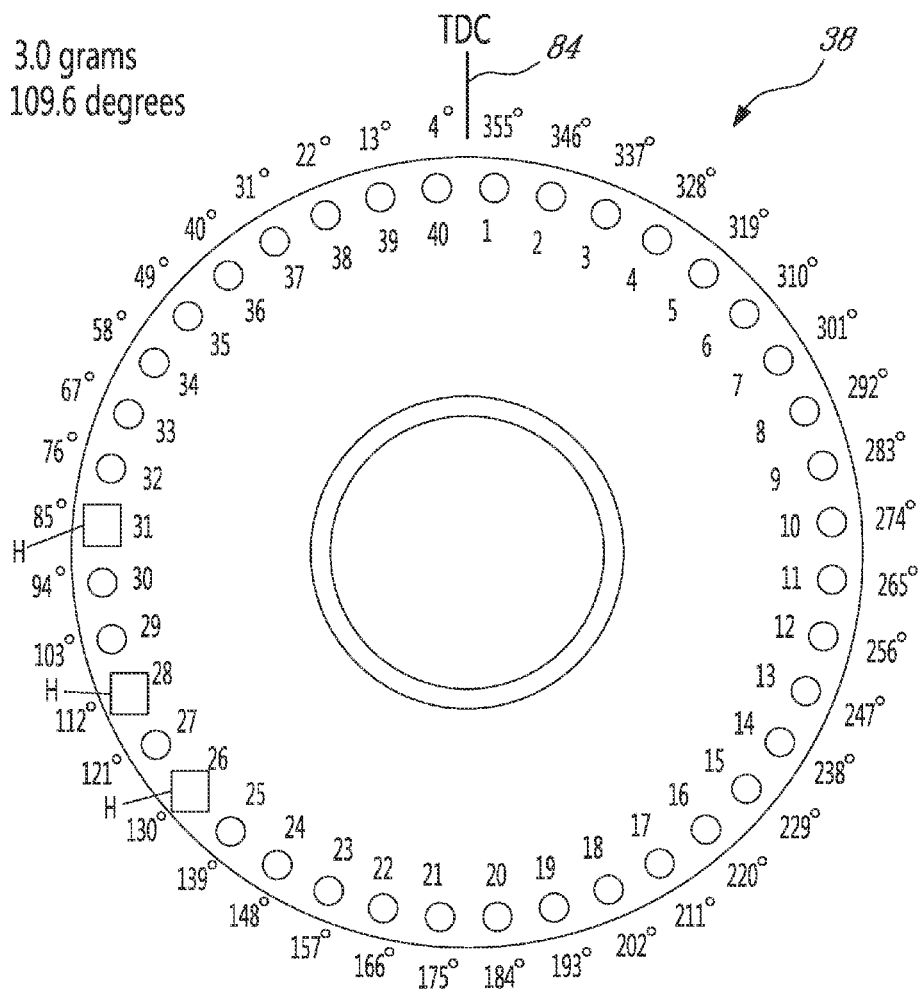
FIG. 12 is another schematic representation of the balancing rim of FIG. 10 viewed along the axis of rotation of the high-pressure spool with correction weights mounted thereon.

FIG. 12 is another schematic representation of first balancing rim 38 with three correction weights labeled as "H". The correction weights have been installed on first balancing rim 38 via holes #26, #28 and #31 at 130°, 112° and 85° respectively.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems, devices and assemblies disclosed and shown herein may comprise a specific number of elements/components, the systems, devices and assemblies could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A method useful in balancing a high-pressure spool of a gas turbine engine, the method comprising:
    generating one or more vibration signals representative of vibration of the high-pressure spool during operation of the gas turbine engine;
    using an output of an accessory gear box driven by the high-pressure spool during operation of the gas turbine engine, generating once-per-revolution signals representative of respective revolutions of the high-pressure spool; and
    using the one or more vibration signals and the once-per-revolution signals, determining a balancing solution for the high-pressure spool;
    determining a correlation between the once-per-revolution signals and an angular position of the high-pressure pool; and
    using the correlation and the balancing solution to balance the high-pressure spool.

2. The method as defined in claim 1, wherein generating the once-per-revolution signals comprises converting a rotational speed of the output of the accessory gearbox to a rotational speed substantially identical to that of the high-pressure spool.

3. The method as defined in claim 1, wherein generating the once-per-revolution signals comprises detecting a trigger having substantially the same rotational speed as that of the high-pressure spool.

4. The method as defined in claim 3, wherein determining a correlation between the once-per-revolution signals and the angular position of the high-pressure spool comprises correlating an angular position of the trigger with the angular position of the high-pressure spool.

5. The method as defined in claim 1, wherein the once-per-revolution signals are based on the detection of a single trigger having substantially the same rotational speed as that of the high-pressure spool.

6. The method as defined in claim 1, comprising correlating the one or more vibration signals with the one or more once-per-revolution signals based on a common time scale.

7. The method as defined in claim 1, comprising using a first correlation between the one or more vibration signals and the once-per-revolution signals and a second correlation between the once-per-revolution signals and angular positioning of the high-pressure spool to balance the high-pressure spool.

8. The method as defined in claim 7, wherein the balancing solution is representative of a correction weight and an associated angular position on the high-pressure spool.

9. The method as defined in claim 1, comprising:
    driving a first rotatable trigger using the output of the accessory gear box at a first speed ratio;
    driving a second rotatable trigger using the output of the accessory gear box at a second speed ratio; and
    generating the once-per-revolution signals based on the detection of one of the first rotatable trigger and the second rotatable trigger.

10. The method as defined in claim 9, wherein:
    the first speed ratio is configured to permit a rotational speed of the first trigger to be substantially identical to a rotational speed of the high-pressure spool; and
    the second speed ratio is configured to permit a rotational speed of the second trigger to be substantially identical to a rotational speed of a high-pressure spool of another gas turbine engine when used with the other gas turbine engine.

* * * * *